US009100776B2

(12) United States Patent
Basir

(10) Patent No.: US 9,100,776 B2
(45) Date of Patent: Aug. 4, 2015

(54) LOCATION BASED EVENT REMINDER FOR MOBILE DEVICE

(75) Inventor: Otman Adam Basir, Waterloo (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 1331 days.

(21) Appl. No.: 11/245,488

(22) Filed: Oct. 6, 2005

(65) Prior Publication Data

US 2006/0077055 A1 Apr. 13, 2006

Related U.S. Application Data

(60) Provisional application No. 60/522,490, filed on Oct. 6, 2004.

(51) Int. Cl.
*H04W 4/02* (2009.01)
*G06Q 10/10* (2012.01)

(52) U.S. Cl.
CPC .............. *H04W 4/02* (2013.01); *G06Q 10/109* (2013.01)

(58) Field of Classification Search
USPC ............... 455/456, 414, 414.2, 404.2, 414.1, 455/456.1–457; 342/350–357; 340/539.11
See application file for complete search history.

(56) References Cited

U.S. PATENT DOCUMENTS

| | | | |
|---|---|---|---|
| 6,169,498 B1 | 1/2001 | King et al. | |
| 6,360,167 B1 | 3/2002 | Millington et al. | |
| 6,377,210 B1 | 4/2002 | Moore | |
| 6,381,580 B1 | 4/2002 | Levinson | |
| 6,392,548 B2 * | 5/2002 | Farringdon et al. | 340/573.1 |
| 6,429,812 B1 * | 8/2002 | Hoffberg | 342/357.1 |
| 6,658,268 B1 | 12/2003 | Bodnar et al. | |
| 6,668,177 B2 * | 12/2003 | Salmimaa et al. | 455/456.3 |
| 7,013,435 B2 | 3/2006 | Gallo et al. | |
| 7,221,937 B2 | 5/2007 | Lau et al. | |
| 2002/0010615 A1 | 1/2002 | Jacobs | |
| 2002/0068583 A1 * | 6/2002 | Murray | 455/456 |
| 2002/0087382 A1 | 7/2002 | Tiburcio | |
| 2003/0060214 A1 | 3/2003 | Hendrey et al. | |
| 2003/0069983 A1 | 4/2003 | Mukund | |

(Continued)

FOREIGN PATENT DOCUMENTS

| | | | | |
|---|---|---|---|---|
| EP | 1008946 | | 6/2000 | |
| EP | 1361727 A2 * | 11/2003 | | H04L 29/06 |

(Continued)

OTHER PUBLICATIONS

Lau et al., U.S. Appl. No. 60/377,644, filed May 6, 2002, "Event Reminder Method".

*Primary Examiner* — Daniel Lai
(74) *Attorney, Agent, or Firm* — Carlson, Gaskey & Olds, P.C.

(57) ABSTRACT

Utilizing a spatial calendar device and service, the user can associate an event reminder to a location in space. The location can be fed into the device manually, from the map unit, GIS address book unit, or from the current reading of the GPS unit, as well as any other source of GPS location media. An event reminder can be text and/or audio to remind the user of a specific thing to do or pick once he or she approaches the location. Examples: once at the parking lot of an airport (inside the car or in the vicinity of the car), the user can associate a reminder (text, audio, or visual) to the location of his/her vehicle at the airport. In this case the system will automatically read the GPS location of the car and will prompt the user to enter an audio or text event reminder.

15 Claims, 3 Drawing Sheets

(56) References Cited

U.S. PATENT DOCUMENTS

| | | |
|---|---|---|
| 2003/0135559 A1 | 7/2003 | Belloti et al. |
| 2004/0192337 A1* | 9/2004 | Hines et al. ................ 455/456.1 |
| 2004/0203847 A1 | 10/2004 | Knauerhase et al. |
| 2004/0207522 A1* | 10/2004 | McGee et al. ........... 340/539.13 |
| 2005/0073443 A1 | 4/2005 | Sheha et al. |
| 2005/0101335 A1* | 5/2005 | Kelly et al. ................ 455/456.3 |
| 2005/0227711 A1* | 10/2005 | Orwant et al. ............. 455/456.3 |
| 2006/0026499 A1 | 2/2006 | Weddle |

FOREIGN PATENT DOCUMENTS

| | | |
|---|---|---|
| WO | 00/22860 | 4/2000 |
| WO | 01/04577 | 1/2001 |
| WO | 01/27759 | 4/2001 |

* cited by examiner

LOCATION BASED EVENT REMINDER FOR MOBILE DEVICE

This Application claims priority to U.S. Provisional Application Ser. No. 60/522,490, filed Oct. 6, 2004.

BACKGROUND OF THE INVENTION

Many people now routinely carry mobile devices such as mobile phones, personal digital assistants, integrated phones/PDAs or other mobile devices with calendar functions. Existing calendars and personal information management systems are useful to leave reminders for appointment dates and times, but are ignorant of physical location. The lives of everyone, from a busy business executive to a salesperson to a student are not dictated solely by date and time. How much time is wasted when you search for you car in a large parking lot? How often do you pass by an important building, only to make another trip later? How many trips past the grocery store does it take to remember to pick up that required ingredient? Outstanding tasks in our lives are almost always tied to a physical location, yet we have no simple way to leave reminders.

A need exists for help to organize our lives around both time and space. A device and/or service that takes advantage of its location can remind us when we need to pick up an important item from the approaching store, allow us to quickly recall notes about a client site, and allow us to keep track of useful information associated with specific places.

SUMMARY OF THE INVENTION

The number of mobile devices is increasing rapidly. The spatial calendar of the present invention utilizes these mobile devices as platform to address the need for a personal information management system that is aware of the path it travels through both space and time. The spatial calendar utilizes these currently deployed handheld tools to augment both our memory and our perception. Reminders will be provided when you approach an important location, notifications will be sent when you need to do something nearby, and you will be able to easily track down difficult to find items.

The system is mainly a software module that can deliver the functionality described herein as long as it is executed on a device that can supply it with GPS (or other source) reading of its current location. For example, the device can be a GPS-enabled phone, a car navigation system, a cellular phone that can obtain GPS location using cellular-GPS capabilities, a laptop, desk computer, pocket computer, a Palm or BlackBerry Device.

Utilizing the spatial calendar, the user can associate an event reminder to a location in space (Space to Event Association (SEA)). The location can be fed into the device manually, from the map unit, GIS address book unit, or from the current reading of the GPS unit, as well as any other source of GPS location media.

An event reminder can be text and/or audio to remind the user of a specific thing to do or pick once he or she approaches the location. Examples: once at the parking lot of an airport (inside the car or in the vicinity of the car), the user can activate the SEA function to associate a reminder (text, audio, or visual) to the location of his/her vehicle at the airport. In this case the system will automatically read the GPS location of the car and will prompt the user to enter an audio or text event reminder.

The user can create a library of audio and text event reminders and use them in association with geographical locations.

As another example, at home the user can associate an event reminder to the address of a store in his/her way. The reminder message can be simply to pickup milk from a grocery store once the system realizes that the user is in the vicinity of any grocery store or a specified grocery store (specified from map, address, or GPS).

Reminder Triggering: The system keeps a memory of event reminders in conjunction with their GPS locations. The user can specify at what distance from the location of an event the reminder should be triggered. For example, the user can specify that the event reminder "car parking" be triggered once the user is within 500 m from the car. Another example, the user can specify that if he is driving with 2 km distance from a given grocery store a reminder of the event "Pick up diapers on your way home".

The user provides a functionality that allows the user to combine temporal (time) events with location events. For instance, the user can specify triggering a certain location event reminder can only happen after 7 PM. The same for time events.

Navigation to location events: The invention includes a navigation module which guides the user towards a location event. For instance, the module can guide the user using an onboard map, directional arrow, or clock numbering system (e.g., "the car is at 1 O'clock from you").

Reminders Retrieval and Display: The invention includes a module that allows the user to display, and scan through stored event reminders, to delete or modify them.

Location Labeling and Storing: The user can label his/her current location with a text description of the location (e.g, Toronto airport, my-favorite JC Penny-), or an audio or visual description. This information is stored in the system's Location Address Book.

Location Address Book: Contains locations labeled and stored by the user, or acquired from other sources (e.g., Locations of places such as parking areas, hotels, parks, gas stations, grocery stores, press stands, etc., or Location Address Books supplied by other users of similar device)

For example, if you open the last container of milk while preparing breakfast, a few quick taps on your mobile device serves as a reminder to yourself. Later that day, on the way home from work, your mobile device notices that you are approaching a grocery store. It has been a long day and you forgot all about breakfast. A pleasant reminder is spoken to you about the milk you need to pick up, with simple directions to the approaching grocery store. You conveniently make a stop at the store to pick up the required milk.

As another example, you return from a pleasant flight, only to be faced with the daunting task of finding your vehicle. As you walk outside, you turn to your mobile device for a little help, and ask it where your vehicle is located. It quickly notifies you to turn left and find your vehicle about 500 m ahead. Your mobile device continues to assist with a "radar" display as you walk toward your destination.

As yet another example, as you enjoy the road ahead, you completely forget about the remaining fuel in your vehicle. Luckily, your mobile device reminds you about the approaching gas station far enough ahead of time for you to exit the highway and stop for gas.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
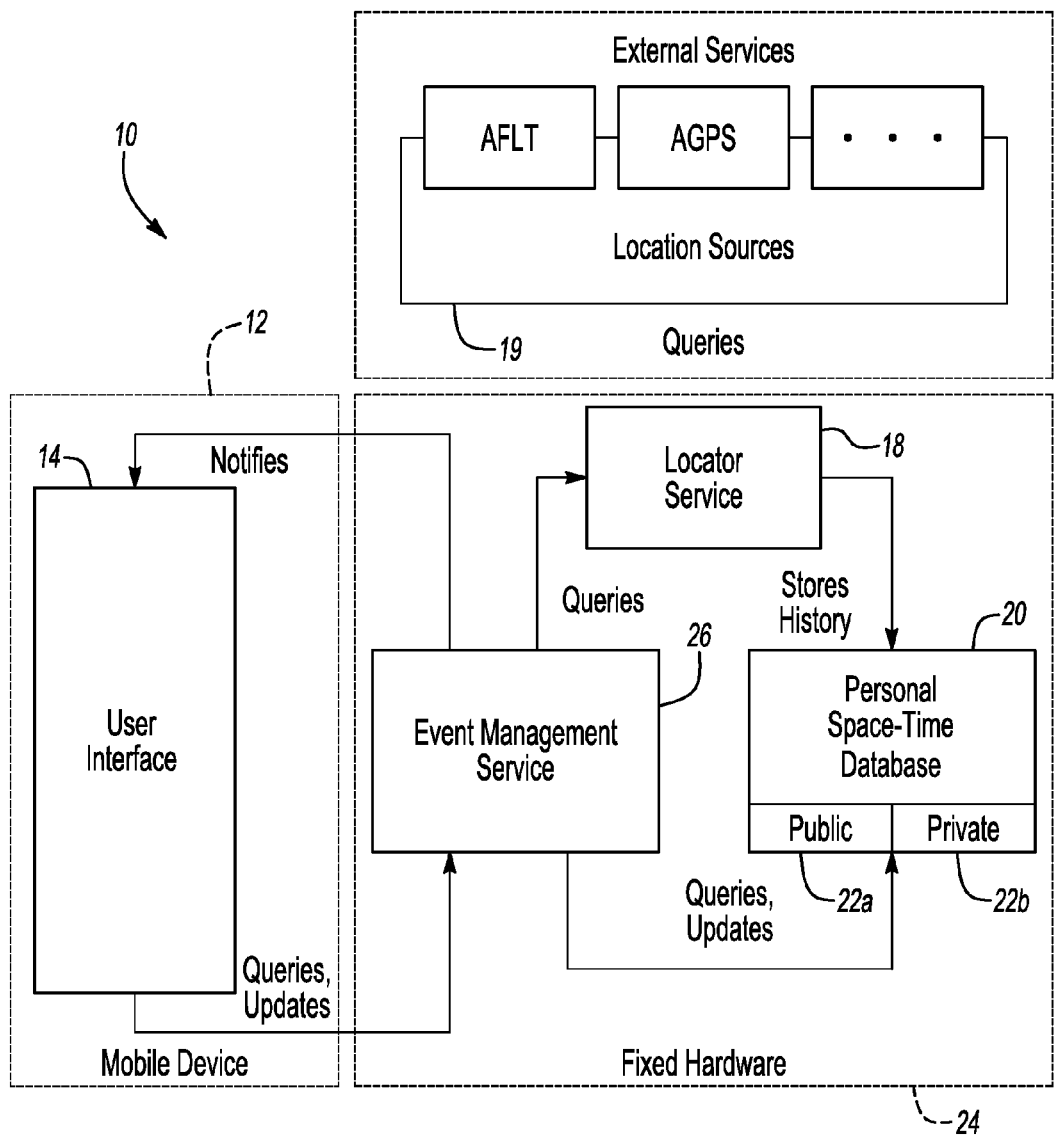
FIG. 1 is a schematic of a spatial calendar system implemented with a limited function mobile phone.
Figure 2:
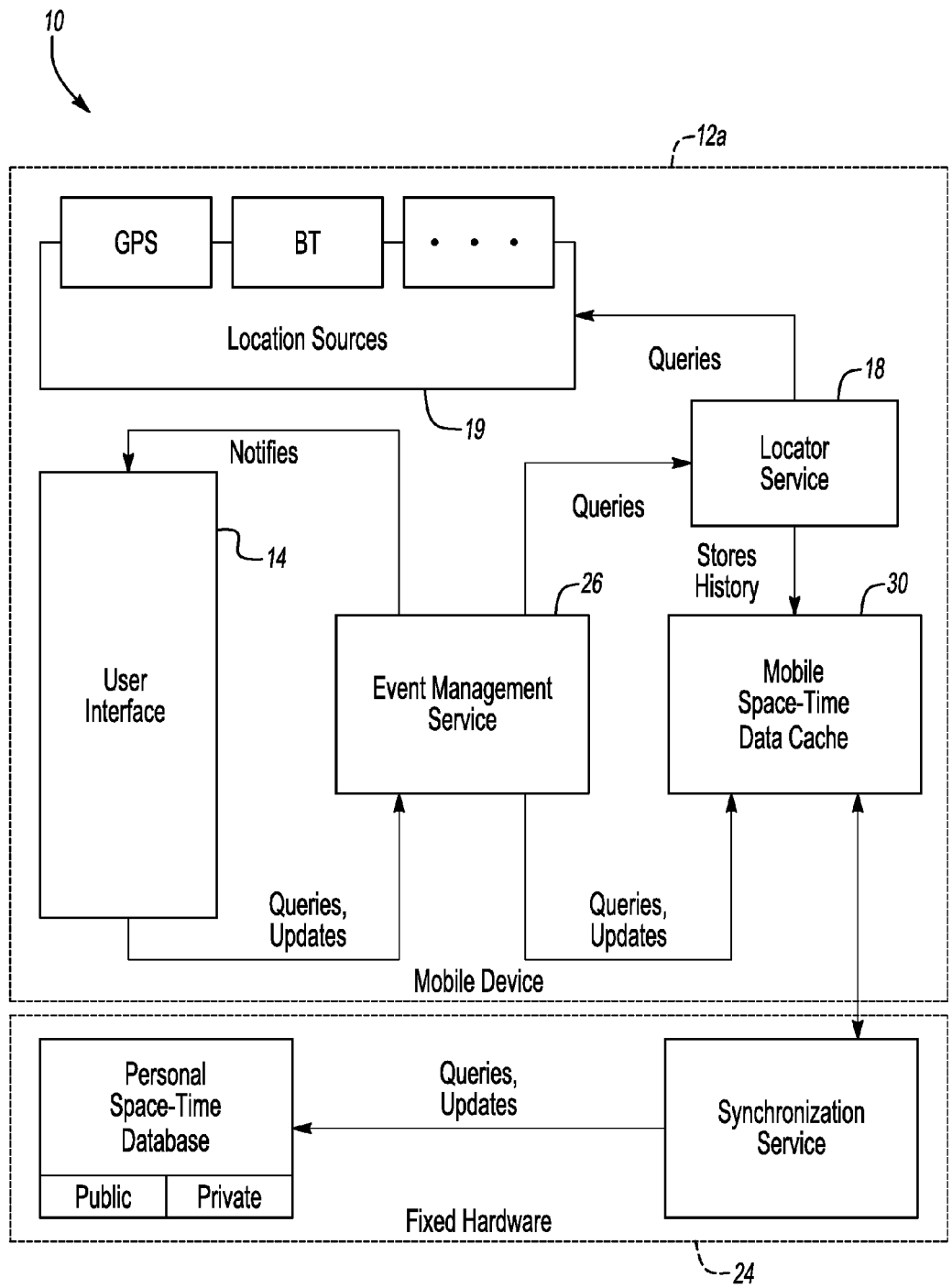
FIG. 2 is a schematic of the spatial calendar system of FIG. 1 implemented with a full function mobile phone/PDA.

One embodiment of the spatial calendar system 10 of the present invention is shown in FIG. 1 for use with a limited capability mobile device 12 (e.g. simpler cell phone). The spatial calendar system 10 is shown in FIG. 2 in use with a more capable and independent mobile device 12a, where some of the services previously performed by the server 24 are performed on the mobile device 12a. Except where otherwise indicated, the following description applies to both embodiments of the system 10, 10a, which will be referenced generically as system 10, for use with limited and full capability mobile devices 12, 12a, which will be referenced generically as mobile device 12.

The proposed modular architecture of the spatial calendar system 10 shown in FIGS. 1 and 2 is designed to support a simple, transparent user interface on everything from a limited capability mobile device 12 (such as a traditional mobile phone) (FIG. 1) to an integrated PDA/phone to a standalone PDA/GPS device 12a (FIG. 2).

User Interface: The primary user interface 14 for the user is the mobile device 12 itself, where space-time events can be created, located, and used for automatic notification. The mobile device 12 user interface 14 should be as simple as or simpler than a pen and a pad of paper. The user interface 14 presents notifications from the event management service 16 in addition to event creation, modification, and search.

Event Management Service: The event management service 16 is responsible for monitoring the state of space-time events. This service is also responsible for sending reminders to the user interface 14 at the appropriate places and times when event conditions are satisfied. Knowledge of the maximum speed, time, location, and active space-time events allows the event management service to put the device into low-power mode when event conditions are guaranteed to be false for extended periods of time.

Locator Service: The locator service 18 is responsible for estimating the position of a mobile device 12 (and ideally, the associated user). The physical source 19 of position information is abstracted by this service to both keep the system flexible and robust. Flexibility to incorporate additional or alternate sources of position is important to improve accuracy and coverage. Robustness is achieved by decoupling the decision process from the physical source of position information. The locator service 18 will provide estimates of both position and a measure of accuracy when a physical position source is temporarily unavailable. This service provides both current and historical location information to the event management service 16. The sources 19 of position information can include: AFLT (Advanced Forward Link Trilateration), or other methods for determining mobile device location using cell towers on a mobile phone network; AGPS (Assisted Global Positioning System), where a bare minimum of data (i.e. one satellite) is received by the phone and sent to the wireless network provider, where cell site location information and phone details are combined to reduce time required for the initial position lock and minimize mobile device power consumption; GPS and Bluetooth (i.e. proximity to other Bluetooth devices with known positions, or where proximity to these devices is relevant in itself). Other sources of position information could be used and will no doubt be implemented in the future.

Database: All space-time event information must be reliably maintained in a personal space-time database 20 for effective notification and future use. Required information can be grouped by visibility: public information 22a available to everyone, and private information 22b. The space-time database 20 is maintained on a fixed server 24 in wireless communication with the mobile device 12.

Public Information 22a is available to everyone and includes the locations of relevant buildings (grocery store, gas station, post office), and street address details. This public information 22a may be provided by a third party database or service, such as Microsoft Location Services.

Guaranteed privacy of private information 22b is very important to most end-users. Space-time event information for one individual will be maintained in isolation from other individuals unless explicit permission is granted.

Mobile Service Components in this architecture are not tied to a specific processor or machine. To take advantage of the full spectrum of mobile devices, from low-end mobile phone to high-end PDA, the event management and locator services are distributed between a fixed hardware platform and the mobile device 12 itself. Operating the event management service 26 and locator service 28 locally on the fully-capable mobile device 12a results in improved coverage where wireless network connectivity is not available (FIG. 2). Operating the event management services 26 and locator services 28 on the fixed server 24 (FIG. 1) is required to provide notification capabilities on mobile devices 12 with limited capabilities (J2ME/Bell).

In FIG. 2, an intermediate mobile space-time data cache 30 is used to keep the logic between mobile event management service 26 and locator service 28 consistent with their counterparts on the server 24. This mobile data cache 30 also helps to minimize response time by avoiding wireless communication when local memory permits. Queries against large datasets, including address lookups may be passed directly through to the fixed server 24.

Figure 3:
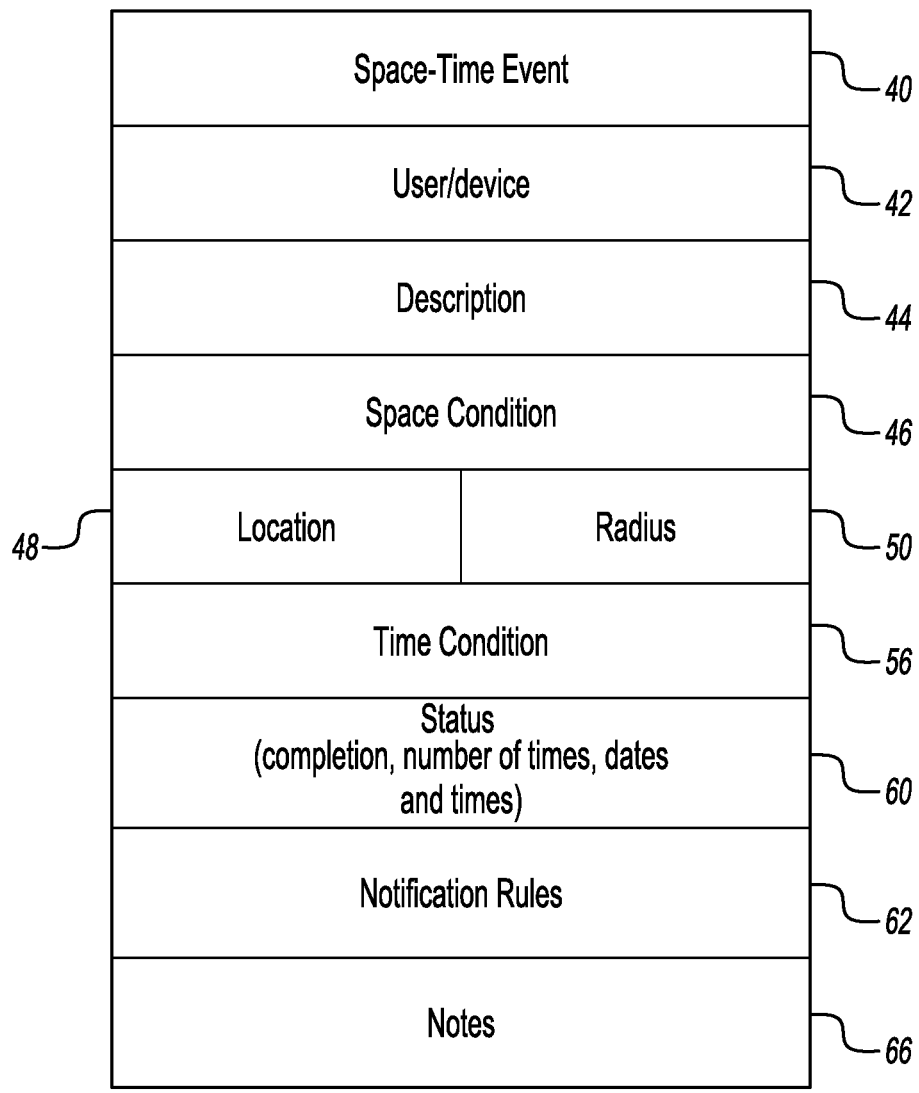
FIG. 3 illustrates a space-time event stored in the spatial calendar of FIG. 1 or FIG. 2.

A space-time event 40 is shown in FIG. 3. A simple set of outstanding space-time events 40 is maintained for each individual in the personal space-time database 20 (FIGS. 1 and 2). Each space-time event 40 may be associated with any combination of location region and/or time interval for future notification. Examples of these space-time event descriptions include; pick up cereal whenever you are near a grocery store (associated with any grocery store—i.e. the event is associated with a generic category of locations, not a specific geographic location), pick up prototype from Bob the next time you visit (associated with Bob at your remote office), or visit the fireworks if you are in Niagara Falls on a Friday night.

Each space-time event 40 is associated with a specific user 42 (or with a specific mobile device 12 (FIGS. 1 and 2)) and includes a simple human-readable description 44. This description 44 does not have to be meaningful to the software, only to the user. The description 44 can be text, an audio clip, video clip, image and or combination of these.

The space-time event 40 also includes space condition(s) 46, which can be a single physical location or a set or category of locations. A fixed location is defined by latitude, longitude, and a description of the surrounding region. In the disclosed embodiment, the space conditions 46 may be circles centered on a location 48 (the latitude+longitude) and described by a radius 50. A space condition 46 is considered satisfied when a predefined region around the mobile device 12 overlaps the region (defined by the radius 50) surrounding the fixed location 48. A fixed location 48 can optionally include a human readable description or address used to resolve the latitude+longitude. Examples of fixed locations include a specific store (i.e. Zehrs #45), one office, or a known address, a set of locations defined by a human readable description (i.e. "Grocery stores", or "Gas stations") and one or more fixed locations. When measuring the distance or finding directions to a set of locations, the closest fixed location 48 is considered.

Each space-time event 40 can optionally include time conditions 56. Time conditions 56 can be specified as a fixed absolute time interval, relative time interval (do this event AFTER some other event is completed), or sets of time intervals. Time intervals require at least one bound (i.e. anytime after Nov. 2, 2004). A relative time interval is specified using an offset from the completion time of another space-time event 40. (i.e. go back to collect a soil sample 7 days after the last time you collected a sample). A set of time intervals can be used to define recurring or regular events. Arbitrary sets of time intervals can be defined, in addition to time intervals that are repeated after fixed durations (i.e. weekly, daily). Repeated time intervals can include "repeat until" and "start repeating from" times.

Each space-time event 40 includes a status 60 (Completion). The number of times an event has been triggered is maintained, along with the corresponding dates and times. This information distinguishes events just entered into the system from old events, and may be useful for the user to filter information and also for the trigger type logic. The date and time the event was created or modified is also maintained.

The user configures the notification rules 62 of the space-time event 40 to notify the user: a) the first time all of its conditions are satisfied; b) each time all of its conditions are satisfied; or c) never.

The space-time event 40 can include associated notes 66. A note 66 is useful to leave a long reminder for a future visit. The note 66 can be text, audio, image and/or video.

The user can create, remove, and modify all space-time events 40 directly from the mobile device 12.

The user can create a "thumbtack on the map," or location marker at the user's current location with minimal user interaction (this is particularly useful to remember where you left your car). This action creates a space-time event 40 with a space condition 46, a reasonable default radius 50, and no trigger for notification in the notification rules 62. Uses for an event 40 with only a space condition 46 include helping to remember where a vehicle was parked in an airport or other large parking space, and also to leave location specific notes 66 as useful reminders for future visits. More complex events can be created by completing the space-time event 40 description 44. An event 40 must have at least one of: description 44, space condition 46, time condition 56. All other event information is optional.

Space conditions 46 can be entered: a) Automatically using the current location+a reasonable default radius 50 that the user can override and modify; b) Resolved from an address or range of addresses (postal code)+a reasonable default radius (perhaps based on building density) that the user can override and modify; c) Selected on a map (including radius), or d) Selected from known locations or location sets (presented in a way to minimize effort—perhaps ordered by favorites, most frequently used, most recently used, proximity to current location, and/or some combination of these). Known locations will include a default radius. The user can override a default radius 50 with a few predefined alternate values or with a manually specified radius.

An event 40 can be modified either directly when its conditions are met and the user is notified, or indirectly by first searching for the event. Events 40 can be sorted by name, proximity, date entered, date last triggered, time condition, and filtered by: a) Freeform text (in description, address, or notes); b) Proximity to a given location (specify location as address or using a map). The relative age of locations on a map will be indicated (i.e. brighter=newer, darker=older). c) Date entered; d) Date triggered; e) Time condition (an interval). Once an event is located, any of its details can be modified or the event itself can be removed. If the conditions of an event are modified, the event is considered a new event for the purposes of the trigger type "the first time all the conditions are met."

The user will be notified as soon as all of the space conditions 46 and time conditions 56 of an event 40 are satisfied. Notification methods include optional audible prompts, vibration, and visual details about the space-time event 40. An event 40 with no trigger, such as a location marker where you left your car in the parking lot, will only generate passive visual messages when its conditions are satisfied. Events with triggers may also generate audible prompts or vibration when their conditions are satisfied. The desired notification rules 62 (audible, silent, display only) can be set by the user and remain in effect for all future notifications until changed. When an event's conditions are met, the user can (easily): a) Silence/Acknowledge.; b) Postpone. (Postponing an event will notify the user again after either a user specified reasonable time duration (e.g. 15 minutes) or when the conditions are about to change from true to false, whichever occurs first); c) Do nothing; d) Change the event's trigger type (fire the next time, always, never); e) Delete; or f) Edit or view further event details (notes, last trigger, etc.)

Unnecessary notifications are avoided to prevent false alarms, by using hysteresis around space conditions 46 and/or a minimum time or distance between successive notifications. The velocity of the user and precision of location measurements may also be used to determine if space conditions 46 are satisfied. Velocity and precision is important to accommodate both travel by foot and travel by vehicle. A region around the user that includes a predicted path over a short time period will be considered. If any part of the region around the user overlaps with any part of the region defined in a space condition, the space condition 46 is satisfied. When event notifications occur at the same time (all conditions are met for more than one event), the most recent event is shown to the user with an indication that multiple events occurred.

Lost (but previously marked) locations are found using the same mobile device interface. The same search options exist whether modifying an event or trying to find a lost location. Events with associated space conditions are included in the search, along with known locations (gas stations, grocery stores, other points of interest). Once a location is selected, either relative arrows and distance or cardinal direction and distance will be provided, depending on availability of orientation information. The user can then request map directions (obtained using an existing navigation application). Depending on accuracy and availability of location information, the mobile device can also be used to help find a marker with a regular audible (i.e. "Geiger counter mode") or visual ("radar mode") indication of proximity while the user is moving. An event can be directly modified or removed at any time after it is selected. A map with road directions can be provided on traditional mobile phones by integrating with Microsoft's Map Location Service.

The user does not need to sift through unnecessary information. Predefined sets of locations are provided, including grocery stores, gas stations, and hotels, but the user can: a) Define personal sets of locations. This can be useful for a real-estate agent to add sets of houses they are trying to push, or an individual that prefers certain types of grocery stores. b) Hide/remove predefined sets that are of no use to the individual c) Define aliases or abbreviations for commonly used locations ("Moe's", or "office") d) Define aliases or abbreviations for commonly used time intervals ("morning" or "after dinner" have different meanings depending on an individual's schedule) Aliases and custom/personal sets of locations can be used to minimize data entry time.

Preferably, the management of space-time events 40 can also be done using a desktop PC and/or a web interface.

A space condition 46 can be added that is tied to another mobile device 12 (phone, vehicle), not to a fixed longitude/latitude. For privacy reasons, the user of a mobile device 12 must explicitly grant permission to expose their location to other mobile devices 12. Uses for mobile locations include specifying events as "remember to pick up the briefcase the next time you are in the car" (with an appropriate bluetooth-enabled car), or notification when a delivery vehicle arrives for a pick-up or delivery. Minor adjustments to this can also provide virtual fence functionality for pets/hunters/people.

The user can also send or share some or all of his personal space-time events 40 with others. For example, by choosing to "Share an Event," shared events allow any person in a group of mobile device 12 users to accomplish the task. Some form of task selection/assignment should be possible, and once a shared item is marked completed, it should be marked completed for everyone.

The user can also send a space-time event 40 to another user, so that the space-time event 40 will be added to their personal space-time events 40. The user can also send location details via SMS, instant messaging, or email to users without direct access to the system 10. The user can also leave a virtual note in a public place for future interested visitors (e.g. graffiti without property damage, or food reviews left at the restaurant by previous customers).

Realistically, a person will not spend the time and effort to manage more than one organizer/PIM system. Synchronizing space-time events with existing desktop applications (e.g Outlook) is one option to reduce double-entry. It may be difficult to preserve the space information of events 40, but use of contact names is useful for address lookups by name.

The system 10 also may utilize predictive reasoning. Knowing the location and time of events 40 allows your mobile device 12 to also predict how long it will take for you to travel to a meeting or other scheduled appointment from the user's current location. Reminders should take this time into consideration and notify the user, giving enough time for the user to actually travel to their appointment. One approach to include predictive reasoning is to add a new trigger type for an appointment or meeting, and include relevant logic in the event notification service.

The system 10 also provides inter-device communication. Modern phones and vehicles communicate without user intervention to use the vehicle sound system for hands free communication. The device 12 can also take advantage of passing devices to help determine location. For example, the device keeps track of when the user leaves their vehicle and automatically stores a "thumbtack" to help find it later (no user effort/time).

With an integrated camera, the mobile device 12 can also take images with embedded location information. store and find images based on where they were taken.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers in method steps are for ease of reference in dependent claims and do not signify a required sequence unless otherwise specified.

What is claimed is:

1. A system for generating spatially-triggered reminders comprising:
    a database of events, each event including a space condition, wherein at least a first space condition of the space conditions is a category of locations, the category of locations including a plurality of geographically-separated locations;
    a position-determination system determining a current location; and
    an event manager comparing the space conditions of the events to the current location and generating a notification based upon the comparison of the space conditions and the current location, the event manager generating the notification based upon the current location matching any of the plurality of geographically-separated locations included in the category of locations, wherein the event manager generates the notification based upon a rate of change of the current location.

2. The system of claim 1 wherein each event further includes a time condition, the event manager further comparing the time condition with a current time and generating the notification based upon the comparison of the time condition with the current time.

3. The system of claim 2 further including a user interface providing the notification to a user, wherein the user interface is provided on a mobile device.

4. The system of claim 3 wherein the mobile device includes a mobile phone.

5. The system of claim 3 wherein the mobile device includes a data cache storing the events and wherein the events are also stored on a central server.

6. The system of claim 5 wherein the mobile device and the central server communicate wirelessly.

7. The system of claim 6 wherein the position-determination system is at least partially located on the mobile device.

8. The system of claim 6 wherein the space condition includes a location and a radius.

9. The system of claim 6 wherein the space condition includes another mobile device.

10. The system of claim 6 wherein the event manager compares the current location with the space condition using hysteresis.

11. The system of claim 1 wherein the first space condition is "any grocery store."

12. The system of claim 1 wherein each space condition further includes an event location and a trigger distance, the space condition being met when the current location is within the trigger distance of the event location, and wherein the trigger distance is adjustable by the user independently for each space condition.

13. The system of claim 1 further including a display on which the plurality of events can be displayed in a sort order based upon proximity to a given location.

14. A system for generating spatially-triggered reminders comprising:
    a database of events, each event including a space condition, each space condition including an event location and a trigger distance, wherein the trigger distance is adjustable by the user independently for each space condition, wherein a first space condition of the plurality of space conditions can be met by any one of a plurality of geographically-separate locations;

a position-determination system determining a current location; and an event manager comparing the space conditions of the events to the current location and generating a notification based upon the comparison of the space conditions and the current location, the space conditions being met when the current location is within the trigger distance of the event location, wherein the event manager generates the notification based upon a rate of change of the current location relative to the event location.

15. The system of claim 14 wherein the first space condition is "any grocery store."

* * * * *